US012024260B2

(12) United States Patent
Thomas

(10) Patent No.: US 12,024,260 B2
(45) Date of Patent: Jul. 2, 2024

(54) BRAKE ASSEMBLY

(71) Applicant: HAYES BICYCLE GROUP INC., Mequon, WI (US)

(72) Inventor: John L Thomas, Cedarburg, WI (US)

(73) Assignee: HAYES BICYCLE GROUP INC., Mequon, WI (US)

(*) Notice: Subject to any disclaimer, the term of this patent is extended or adjusted under 35 U.S.C. 154(b) by 294 days.

(21) Appl. No.: 17/367,300

(22) Filed: Jul. 2, 2021

(65) Prior Publication Data
US 2022/0024537 A1 Jan. 27, 2022

Related U.S. Application Data

(60) Provisional application No. 63/055,898, filed on Jul. 23, 2020.

(51) Int. Cl.
B62L 3/02 (2006.01)

(52) U.S. Cl.
CPC .................... B62L 3/023 (2013.01)

(58) Field of Classification Search
CPC .......... B60T 7/04; B60T 7/102; B60T 11/046; B60T 11/16; B60T 11/18; B60T 11/22; B60T 11/165; B60T 11/224; B60T 11/232; B60T 11/236; B62L 1/00; B62L 1/005; B62L 1/10; B62L 1/12; B62L 1/14; B62L 1/16; B62L 3/00; B62L 3/02; B62L 3/023
USPC ........................................................ 188/344
See application file for complete search history.

(56) References Cited

U.S. PATENT DOCUMENTS

| 4,175,648 | A | 11/1979 | Sule |
| 4,840,082 | A | 6/1989 | Terashima |
| 5,515,743 | A | 5/1996 | Lumpkin |
| 5,636,518 | A | 6/1997 | Burgoyne |
| 6,003,639 | A | 12/1999 | Buckley |
| 6,425,464 | B2 | 7/2002 | Lumpkin |
| 6,804,961 | B2 | 10/2004 | Lumpkin |
| 6,883,647 | B1 | 4/2005 | Wen |
| 7,530,435 | B2 | 5/2009 | Lumpkin |
| 7,654,171 | B2 | 2/2010 | Wen |
| 7,857,112 | B1 | 12/2010 | Tsai |
| 8,398,106 | B2 | 3/2013 | Eberlein |
| 8,943,924 | B2 | 2/2015 | Thomas |
| 9,290,232 | B2 | 3/2016 | Snead |

(Continued)

FOREIGN PATENT DOCUMENTS

EP 2543585 A2 * 1/2013 .............. B60T 11/16

Primary Examiner — Robert A. Siconolfi
Assistant Examiner — San M Aung
(74) Attorney, Agent, or Firm — ZIMMERMAN INTELLECTUAL PROPERTY SERVICES LLC

(57) ABSTRACT

A brake assembly for a handlebar of a bicycle is disclosed. The brake assembly may be configured so that the position of the brake lever relative to the handlebar may conveniently be adjusted to fit the preferences of the rider/operator of the bicycle (e.g. adjustment of the default position of the lever relative to the handlebar for the "reach adjust" feature). Adjustment of the default position of the lever relative to the body and handlebar may be provided between a near distance/position through an intermediate distance/position to a far distance/position (e.g. adjustment of "finger contact point"/reference point on brake lever relative to handlebar for preference of a rider/operator of the bicycle).

20 Claims, 7 Drawing Sheets

(56) References Cited

U.S. PATENT DOCUMENTS

| | | | | |
|---|---|---|---|---|
| 2006/0070483 A1* | 4/2006 | Dimsey | .................... | B62L 3/02 |
| | | | | 74/525 |
| 2012/0125143 A1* | 5/2012 | Thomas | ................... | G05G 1/04 |
| | | | | 74/522 |
| 2014/0041379 A1* | 2/2014 | Ruckh | .................... | B62L 3/023 |
| | | | | 60/594 |
| 2015/0266540 A1* | 9/2015 | Snead | .................... | B62L 3/023 |
| | | | | 188/344 |
| 2015/0336629 A1* | 11/2015 | Ruopp | ................... | B60T 11/22 |
| | | | | 60/588 |
| 2016/0177976 A1* | 6/2016 | Ruopp | ................... | B60T 11/16 |
| | | | | 60/592 |
| 2017/0106939 A1* | 4/2017 | Snead | .................... | B62L 1/005 |

\* cited by examiner

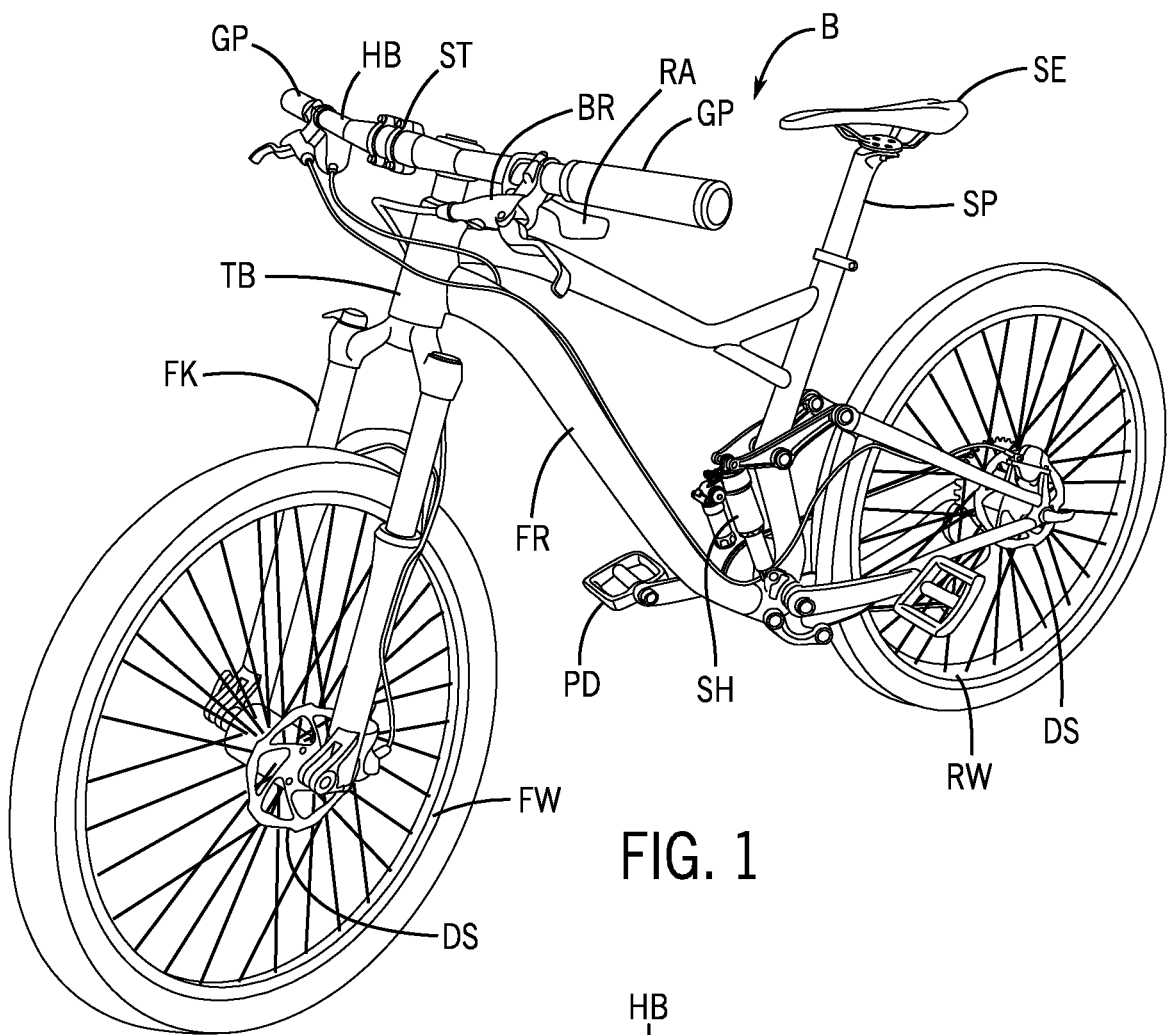
FIG. 1
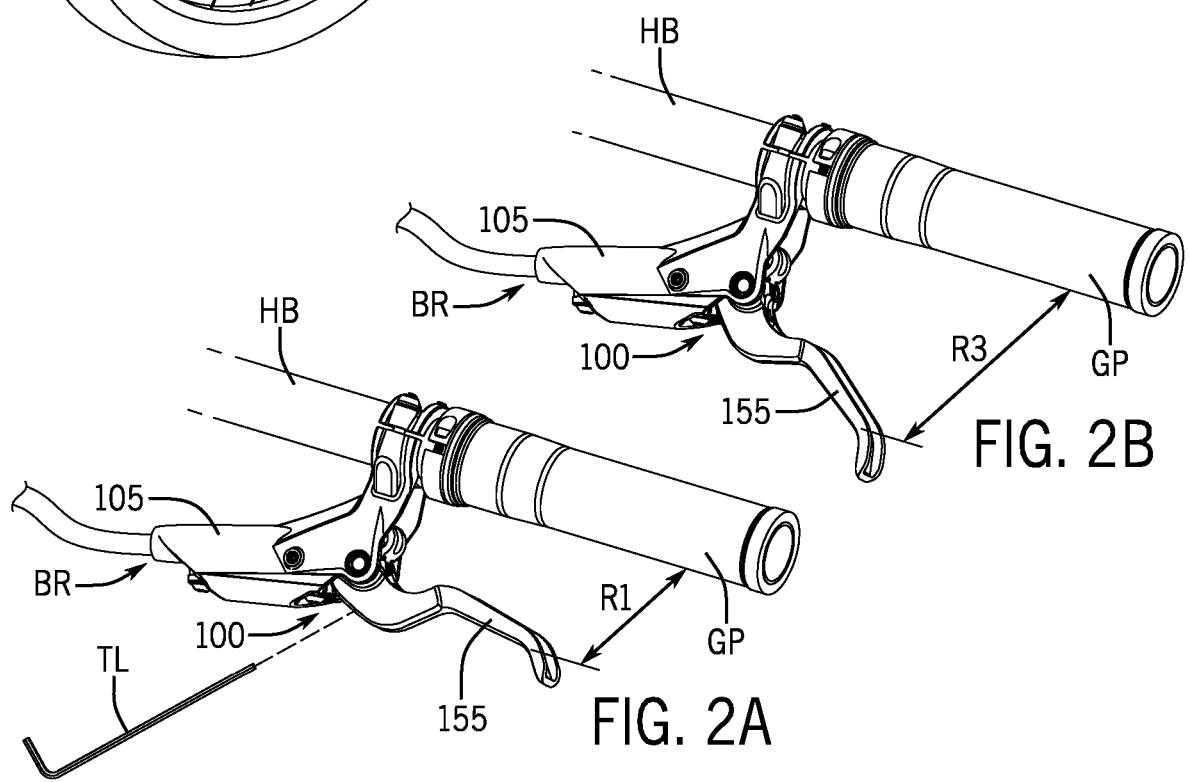
FIG. 2B
FIG. 2A

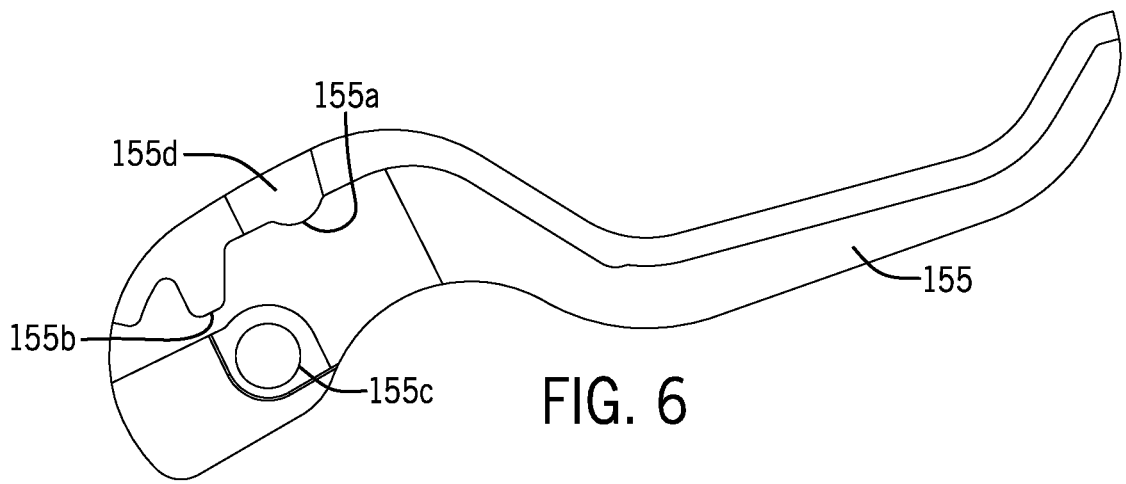
FIG. 6
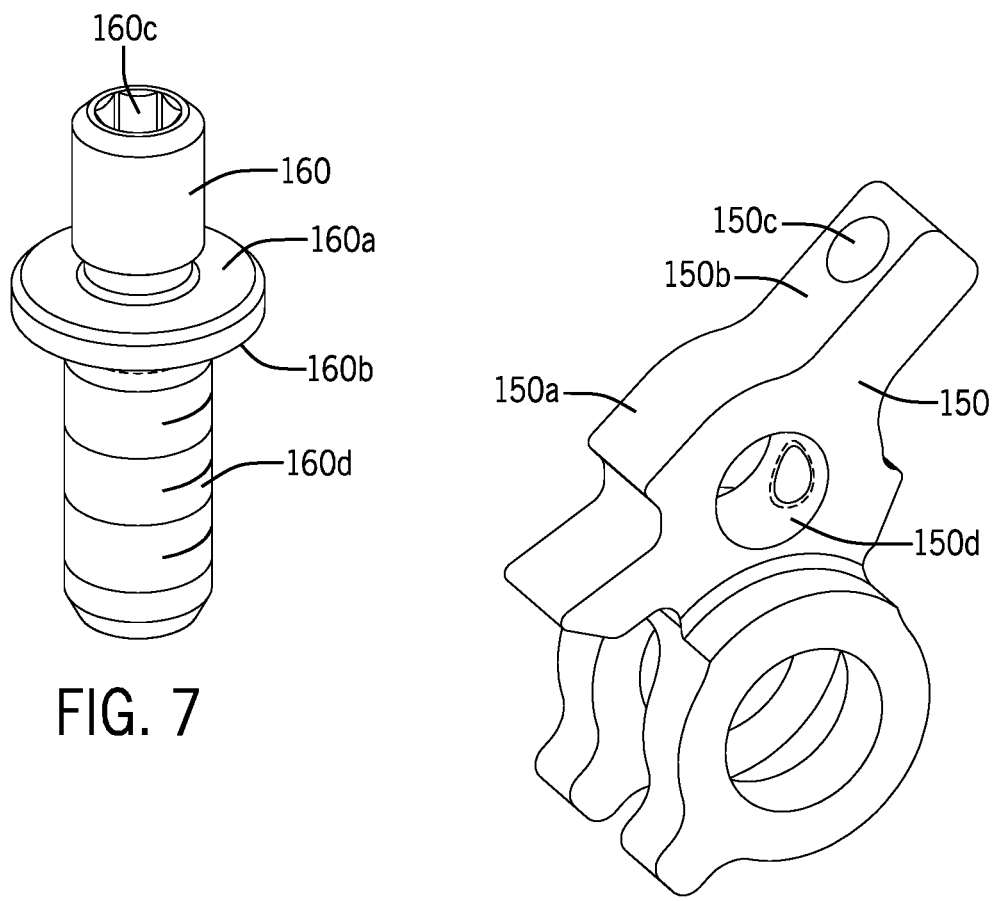
FIG. 7
FIG. 8

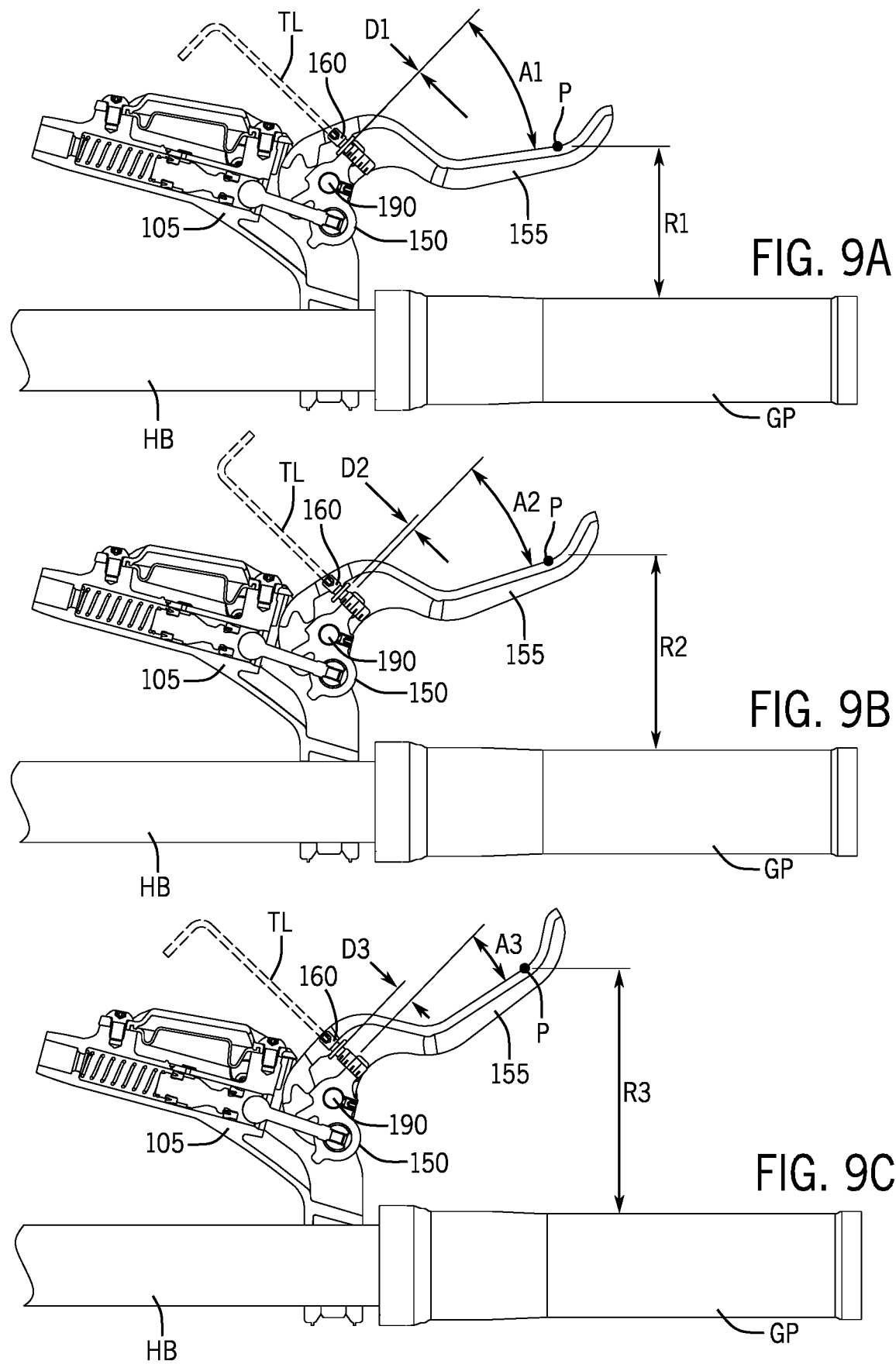

BRAKE ASSEMBLY

CROSS-REFERENCE TO RELATED APPLICATIONS

The present application is a non-provisional application of U.S. Provisional Patent Application No. 63/055,898 titled "BRAKE ASSEMBLY" filed Jul. 23, 2020.

The present application claims priority to and incorporates by reference in full the following patent application: U.S. Provisional Patent Application No. 63/055,898 titled "BRAKE ASSEMBLY" filed Jul. 23, 2020.

FIELD

The present invention relates to a brake assembly for a bicycle.

BACKGROUND

It is known to provide a brake assembly comprising a brake lever on the handlebar of a bicycle. It is also known to provide a mechanism for adjustment of the position of the brake lever relative to the handlebar (e.g. adjustment of the "finger contact point" for a rider/operator of the bicycle).

It would be advantageous to provide an improved brake assembly for a bicycle configured so that the position of the brake lever relative to the handlebar can conveniently be adjusted to fit the preferences of the rider/operator of the bicycle.

SUMMARY

The present invention relates to a brake assembly comprising a body, a piston configured for movement at least partially within the body, a link connected to the piston and configured for pivoting movement relative to the body, an adjuster coupled to the link and a lever configured to contact the adjuster and for pivoting movement relative to the body. The adjuster may be configured so that rotation of the adjuster provides rotation of the lever relative to the link; rotation of the lever relative to the link may comprise adjustment of position of the lever relative to the body. The body may be configured to be mounted on a handlebar of a bicycle; the lever may comprise a finger contact point; and adjustment of position of the lever relative to the body may comprise adjustment of distance of the finger contact point to the handlebar. The adjuster may be coupled to the link by a threaded connection. The link may comprise a first surface; the lever may comprise a stop surface; rotation of the lever relative to the link is limited by contact between stop surface of the lever and the first surface on the link. The link may comprise a second surface; the adjuster may comprise a surface; rotation of the lever relative to the link is limited by contact between the surface on the adjuster and the second surface on the link. The adjuster may comprise a tool interface; the lever may comprise a slot; and the adjuster may be configured to protrude into the slot to allow access at the tool interface. The adjuster may comprise a flange surface; the lever may comprise a cam surface, and the cam surface of the lever is in contact with the flange surface of the adjuster. The link may be connected to a piston and movement of the lever toward the handlebar is transmitted through the cam surface of the lever to the flange surface of the adjuster and through the threaded connection to the link and to the piston. Position of the lever may comprise a default position; adjustment of the position of the lever relative to the body may comprise adjustment of the default position of the lever; the default position of the lever is configured to be adjusted between a near position and a far position through a range of intermediate positions. The body may be configured to be mounted on a handlebar; the lever may comprise a reference point; in the near position the reference point of the lever is nearer to the handlebar than in the far position; in the far position the reference point of the lever is farther from the handlebar than in the near position. The assembly may further comprise a stop for the lever at the near position and a stop for the lever at the far position.

The present invention relates to a hydraulic assembly actuated by use of hydraulic fluid comprising a body and a piston configured for movement at least partially within the body to actuate hydraulic fluid and a link connected to the piston and configured for movement relative to the body and an adjuster coupled to the link and a lever configured to contact the adjuster and for movement relative to the body. The adjuster may be configured so that rotation of the adjuster provides of the rotation of the lever relative to the link; rotation of the lever relative to the link may comprise adjustment of position of the lever relative to the body; position of the lever may comprise a default position; adjustment of the position of the lever relative to the body may comprise adjustment of the default position of the lever; the default position of the lever may be configured to be adjusted between a near position and a far position.

The present invention relates to a method of adjustment of a brake assembly comprising a body providing a lever and configured to be mounted on a handlebar comprising the steps of (a) rotation of an adjuster and (b) translation of the adjuster relative to a link and (c) translation of a cam surface of the lever along a surface of the adjuster and (d) pivoting of the lever relative to the body and (e) rotation of the lever relative to the handlebar; position of the lever relative to the handlebar can be adjusted. The method of adjustment may further comprise the step of rotation of the adjuster with a tool; position of the lever may comprise a default position; rotation of the adjuster may comprise adjustment of the position of the lever relative to the body; adjustment of the position of the lever relative to the body may comprise adjustment of the default position of the lever; the default position of the lever may be configured to be adjusted between a near position and a far position through a range of intermediate positions. The lever may comprise a reference point; in the near position the reference point of the lever is nearer to the handlebar than in the far position; in the far position the reference point of the lever is farther from the handlebar than in the near position. The method of adjustment may further comprise a stop for the lever at the near position and a stop for the lever at the far position. The link may be connected to a piston and movement of the link is transmitted to the piston. The lever may be configured to remain in the default position until actuated by an operator.

The present invention relates to brake assembly comprising a body, a piston configured for movement at least partially within the body, a link connected to the piston and configured for movement relative to the body, an adjuster coupled to the link and a lever configured to contact the adjuster and for movement relative to the body; the adjuster may be configured so that rotation of the adjuster provides rotation of the lever relative to the link; rotation of the lever relative to the link may comprise adjustment of position of the lever relative to the body. The body may be configured to be mounted on a handlebar of a bicycle. Adjustment of position of the lever relative to the body may comprise adjustment of position of the lever relative to the handlebar of the bicycle.

The lever may comprise a finger contact point and adjustment of position of the lever relative to the body may comprise adjustment of distance of the finger contact point to the handlebar. The assembly may comprise a grip; the grip may be configured to be mounted on the handlebar and adjustment of position of the lever relative to the body may comprise adjustment of distance of the finger contact point to the grip. The adjuster may be coupled to the link by a threaded connection. The adjuster may be an adjuster screw. The link may be configured for pivoting movement relative to the body. The lever may be configured for pivoting movement relative to the body. The lever and the link may be configured to pivot on the same axis. The lever may comprise a surface. The link may comprise a first surface; rotation of the lever relative to the link may be limited by contact between the surface on the lever and the first surface on the link. The adjuster may comprise a surface. The link may comprise a second surface; rotation of the lever relative to the link may be limited by contact between the surface on the adjuster and the second surface on the link. Rotation of the adjuster relative to the link may comprise adjustment of distance of the adjuster surface to the second surface on the link. The lever may comprise a finger contact surface and adjustment of position of the lever relative to the body may comprise adjustment of angle of the finger contact point relative to the second surface on the link. The assembly may comprise a tool configured to adjust the adjuster. The adjuster may comprise a tool interface. The lever may comprise a slot; the adjuster may be configured to protrude into the slot to allow access at the tool interface. The adjuster may comprise a flange surface; the lever may comprise a cam surface, and the cam surface of the lever may be in contact with the flange surface of the adjuster. Movement of the lever toward the handlebar may be transmitted through the cam surface of the lever to the flange surface of the adjuster and through the threaded connection to the link. The link may be connected to a piston and movement of the link may be transmitted to the piston through a pushrod. Position of the lever may comprise a default position. Adjustment of the position of the lever relative to the body may comprise adjustment of the default position of the lever; the default position of the lever may be configured to be adjusted between a near position and a far position. Adjustment of the position of the lever may comprise adjustment through an intermediate position between the near position and the far position. The body may be configured to be mounted on a handlebar; the lever may comprise a reference point; in the near position the reference point of the lever may be nearer to the handlebar than in the far position; in the far position the reference point of the lever may be farther from the handlebar than in the near position. The intermediate position may comprise a range of positions between the near position and the far position. The adjuster may be configured to adjust the lever from the near position to the far position through the intermediate position. The assembly may comprise a stop for the lever at the near position. The assembly may comprise a stop for the lever at the far position.

The present invention relates to an apparatus configured for a brake system of a bicycle comprising a body, a piston configured for movement at least partially within the body, a link connected to the piston and configured for movement relative to the body, an adjuster coupled to the link, a lever configured to contact the adjuster and for movement relative to the body; the adjuster may be configured so that rotation of the adjuster provides rotation of the lever relative to the link; rotation of the lever relative to the link may comprise adjustment of position of the lever relative to the body. The apparatus may comprise a tool configured to adjust the adjuster. The body may be configured to be mounted on a handlebar of the bicycle. Adjustment of position of the lever relative to the body may comprise adjustment of position of the lever relative to the handlebar of the bicycle. The apparatus may comprise a brake assembly. The apparatus may comprise a brake master cylinder assembly.

The present invention relates to a master cylinder assembly comprising a body, a piston configured for movement at least partially within the body, a link connected to the piston and configured for movement relative to the body, an adjuster coupled to the link, a lever configured to contact the adjuster and for movement relative to the body; the adjuster may be configured so that rotation of the adjuster provides rotation of the lever relative to the link; rotation of the lever relative to the link may comprise adjustment of position of the lever relative to the body.

The present invention relates to a hydraulic assembly actuated by use of hydraulic fluid comprising a body, a piston configured for movement at least partially within the body to actuate hydraulic fluid, a link connected to the piston and configured for movement relative to the body, an adjuster coupled to the link, a lever configured to contact the adjuster and for movement relative to the body; the adjuster may be configured so that rotation of the adjuster provides of the rotation of the lever relative to the link; rotation of the lever relative to the link may comprise adjustment of position of the lever relative to the body. Position of the lever may comprise a default position; adjustment of the position of the lever relative to the body may comprise adjustment of the default position of the lever; the default position of the lever may be configured to be adjusted between a near position and a far position.

The present invention relates to a method of adjustment of a brake assembly comprising a body providing a lever and configured to be mounted on a handlebar comprising the steps of rotation of an adjuster, translation of the adjuster relative to a link, translation of a cam surface of the lever along a surface of the adjuster and pivoting of the lever relative to the body; position of the lever relative to the handlebar can be adjusted. The method may comprise the step of rotation of the adjuster with a tool. The method may comprise the step of rotation of the lever relative to a handlebar. Actuation of the brake assembly at the lever may comprise pivoting of the lever relative to the handlebar. The method may comprise the step of modification of a distance of a finger contact point on the lever to the handlebar. Position of the lever may comprise a default position. Rotation of the adjuster may comprise adjustment of the position of the lever relative to the body; adjustment of the position of the lever relative to the body may comprise adjustment of the default position of the lever; the default position of the lever may be configured to be adjusted between a near position and a far position. Adjustment of the position of the lever may comprise adjustment through an intermediate position between the near position and the far position. The lever may comprise a reference point; in the near position the reference point of the lever may be nearer to the handlebar than in the far position; in the far position the reference point of the lever may be farther from the handlebar than in the near position. The intermediate position may comprise a range of positions between the near position and the far position. The adjuster may be configured to adjust the lever from the near position to the far position through the intermediate position. The assembly may comprise a stop for the lever at the near position; the assembly may comprise a stop for the lever at the far position. The link may be connected to a piston and movement of the link may be transmitted to the piston. The link may be connected to a piston and movement of the link may be transmitted to the piston through a pushrod. The link may be connected to a piston and movement of the link may be transmitted to the piston through a pushrod for braking action actuated by the lever. The lever may be configured to remain in the default position until actuated by an operator.

FIGURES

FIG. 1 is schematic perspective view of a bicycle according to an exemplary embodiment.

FIGS. 2A and 2B are schematic perspective views of a brake assembly on a handlebar according to an exemplary embodiment.

FIG. 6 is a schematic perspective view of a lever of a brake assembly according to an exemplary embodiment.

FIG. 7 is a schematic perspective view of an adjuster/element of a brake assembly according to an exemplary embodiment.

FIG. 8 is a schematic perspective view of a link/element of a brake assembly according to an exemplary embodiment.

FIGS. 9A to 9C are schematic top plan views of a brake assembly on a handlebar according to an exemplary embodiment.

DESCRIPTION

Referring to FIG. 1, a bicycle B (such as a mountain bike) is shown schematically according to an exemplary embodiment providing an arrangement of parts/components including a frame FR with a steering tube TB and a seat post SP (with seat SE) and a set of wheels comprising front wheel FW with a front fork assembly FK and rear wheel RW coupled to the frame FR and through a rear shock absorber SH (of a suspension system) and a set of pedals PD; the bicycle provides handlebar HB (coupled to front wheel FW through stem ST and front fork assembly FK and through steering tube TB) with a grip GP and controls for a brake system BR coupled to a brake disc DS (e.g. rotor at/on each of front wheel FW and rear wheel RW) and a gear/shift control SC (coupled to a selectable gear system for rear wheel RW).

As shown schematically according to an exemplary embodiment in FIGS. 1 and 2A-2B, the brake system BR comprises a brake assembly shown as master cylinder assembly 100 with a body 105 configured to be mounted on handlebar HB by a clamp arrangement. See also FIGS. 3 and 4. As indicated schematically in FIGS. 2A-2B, the brake assembly 100 comprises a lever 155 configured to operate as an operator control for the brake system BR. See also FIG. 1 (showing brake assembly set/pair for brake system BR configured to provide operator control/braking for front wheel and rear wheel, e.g. at disk DS). and FIG. 3 (showing pivoting actuation of brake lever as operator control from default position to actuated/engaged position for brake system BR).

Figure 4:
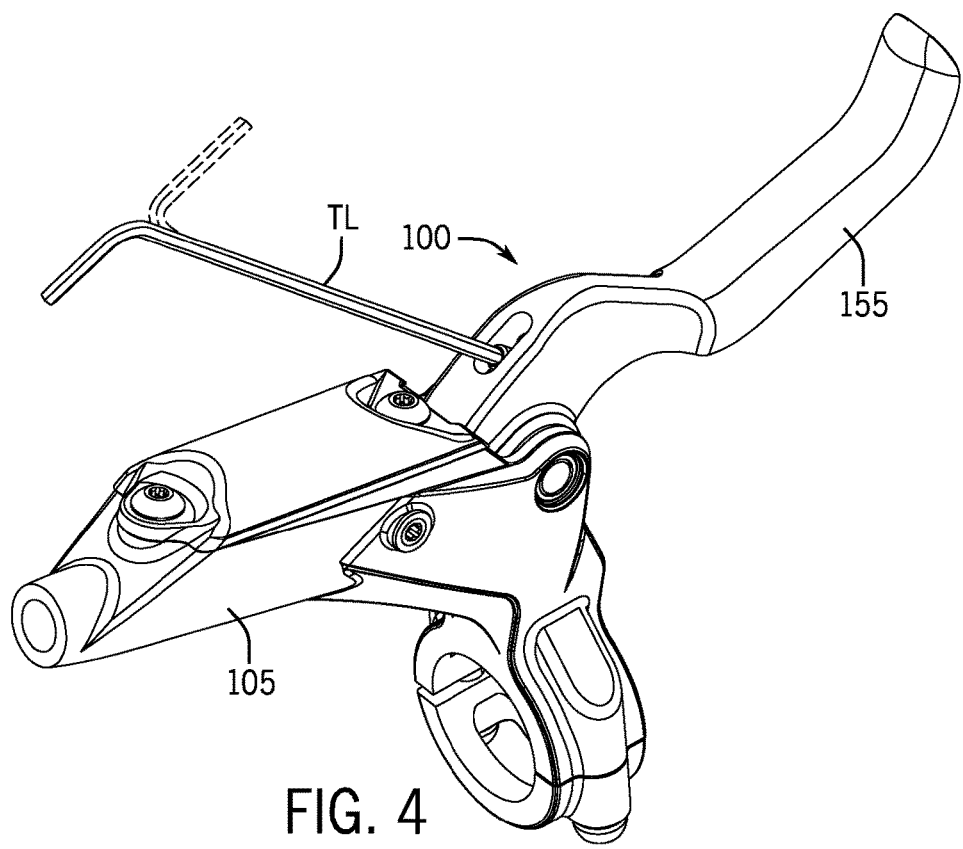
FIG. 4 is a schematic perspective view of a brake assembly according to an exemplary embodiment.

As indicated schematically according to an exemplary embodiment in FIGS. 2A-2B and 4, the brake assembly 100 is configured to provide for adjustment of the default position of the lever 155 relative to the body 105 (and relative to the handlebar HB); as indicated schematically, adjustment is performed using a tool TL inserted into an aperture/slot in lever 155 of the brake assembly 100. As indicated schematically according to an exemplary embodiment in FIGS. 2A-2B, 9A-9C and 10A-10C, the lever 155 may be adjusted to a default position that is relatively nearer to handlebar HB (as shown in FIGS. 2A and 9A); the lever may be adjusted to a default position that is relative farther from handlebar HB (as shown in FIGS. 2B and 9C). See also FIG. 4 (showing use of tool TL shown as Allen wrench rotated in aperture/slot for "reach adjust" feature to set default position of lever of the brake assembly).

Figure 5:
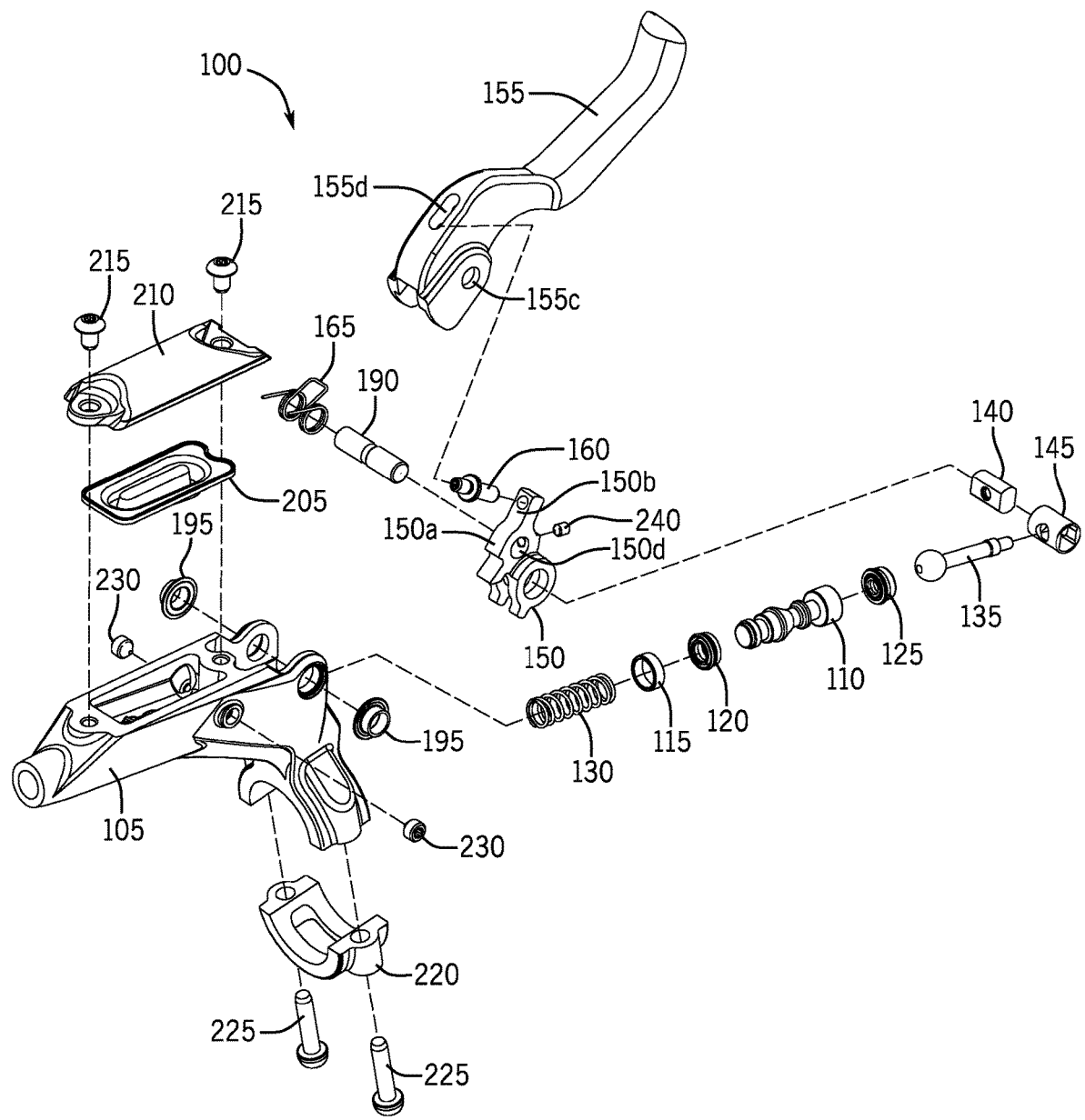
FIG. 5 is a schematic exploded perspective view of a brake assembly according to an exemplary embodiment.

As shown schematically according to an exemplary embodiment in FIG. 5, the brake assembly 100 comprises body 105 comprising a master cylinder arrangement comprising a bladder 205 inserted in a chamber (with bleed screw 230) with cover 210 secured by a set of screws 215; body 105 comprises a clamp arrangement comprising a clamp base 220 configured to secure to body 105 to a handlebar HB by a set of screws 225. See also FIGS. 2A-2B, 3 and 4. As shown schematically in FIG. 5, the brake assembly 100 comprises the master cylinder arrangement with a piston arrangement comprising a piston 110 installed within body 105 with a spring 130 and bushing 115 with primary cup 120 and secondary cup 125 coupled to a pushrod 135. As shown schematically in FIG. 5, the brake assembly 100 comprises a lever/adjuster arrangement comprising the lever 155 coupled for pivotal movement relative to body 105 on a pin 190 in a bushing 195 (with torsion spring 165) and coupled with an adjuster 160 to the pushrod 135 through a bushing 145 secured by a nut 140 to a link 150 (retained on pin 190) by a set screw 240. See also FIGS. 6, 7 and 8.

As shown schematically in FIGS. 5 and 6, the lever 155 comprises a cam surface 155a and a stop surface 155b with a pivot hole 155c (for pin 190) and an aperture/slot 155d (for tool TL). See also FIGS. 9A-9C and 10A-10C. As shown schematically in FIGS. 5 and 7, the adjuster 160 comprises a flange providing a flange surface 160a and a flange surface 160b and a socket 160c (for tool TL) and a threaded portion 160d (for engagement with link 150). As shown schematically in FIGS. 5 and 8, the link 150 comprises a stop surface 150a and a stop surface 150b and a threaded hole 150c (for adjuster 160) and a pivot hole 150d (for pin 190).

As indicated schematically in FIGS. 3, 9A-9C and 10A-10C, the brake assembly 100 and brake system BR is actuated by engagement of cam surface 155a of lever 155 with flange surface 160a of adjuster 160 (biased by torsion spring 165) with threaded engagement of nut 140 through bushing 145 with link 150 coupled to pushrod 135 configured to engage piston 110 of the piston assembly and the master cylinder/bladder for the brake system (e.g. coupled to disk DS at each wheel). See also FIGS. 1 and 5.

Figure 3:
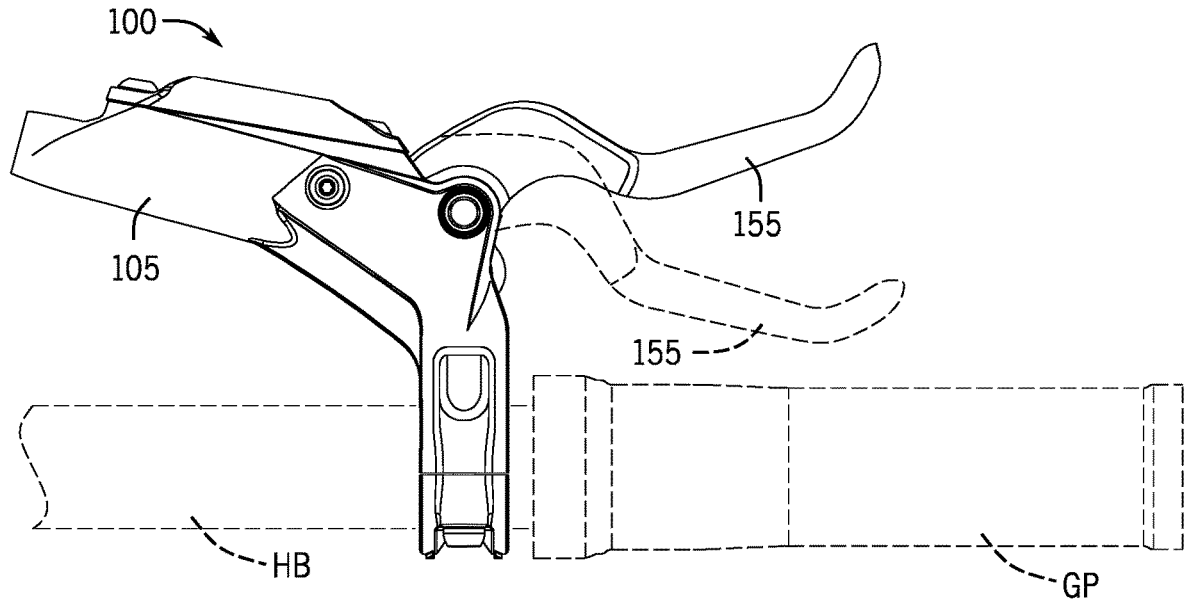
FIG. 3 is a schematic top plan view of a brake assembly according to an exemplary embodiment.

As indicated schematically according to an exemplary in FIGS. 2A-2B, 3, 4, 5 and 9A-9C, the brake assembly is assembled/configured to provide for adjustment of the default position of the lever relative to the body 105 and handlebar HB (compare FIGS. 2A and 2B) and for actuation of the brake system by movement of the lever 155 from a default position to an actuation position by an operator at the handlebar HB/grip GP (see FIG. 3).

Operation/Adjustment ("Reach Adjust" Feature)

Referring to FIGS. 9A-9C and 10A-10C, a brake assembly for a bicycle may be configured so that the position of the brake lever relative to the handlebar may conveniently be adjusted to fit the preferences of the rider/operator of the bicycle. See also FIGS. 1 and 2A-2B and TABLE A (indicating adjustment of the default position of the lever relative to the handlebar for the "reach adjust" feature). As indicated schematically in FIGS. 2A-2B, 9A-9C and 10A-10C, adjustment of the default position of the lever 155 relative to the body 105 and handlebar HB may be provided between a near distance/position R1 through an intermediate distance/position R2 to a far distance/position R3. See also FIG. 4 and TABLE A (e.g. indicating adjustment of "finger contact point" reference position P on brake lever relative to handlebar HB for preference of a rider/operator of the bicycle).

TABLE A

REFERENCE SYMBOL LIST

| REFERENCE SYMBOL | PARAMETER/ADJUSTMENT |
|---|---|
| R1 | Near distance to handlebar adjusted default position setting for lever |
| A1 | Angle of lever at adjusted default position R1 |
| D1 | Adjustment of adjuster at default position R1 |
| R2 | Intermediate distance adjusted default position setting for lever |
| A2 | Angle of lever at adjusted default position R2 |
| D2 | Adjustment of adjuster at default position R2 |
| R3 | Far distance from handlebar adjusted default position setting for lever |
| A3 | Angle of lever at adjusted default position R3 |
| D3 | Adjustment of adjuster at default position R3 |
| P | Reference position for finger contact point for lever |

As indicated schematically in FIGS. 2A-2B, 4, 9A-9C and 10A-10C, rotation of adjuster 160 (e.g. configured to be engaged by tool TL) provides for adjustment of the default position of the lever 155 of the brake assembly 100 relative to the body 105 and handlebar HB (e.g. within a range indicated as between position R1/retracted position and position R3/extended position); rotation of adjuster 160 adjusts the relative position of link 150 and lever 155 with threaded portion 160d of adjuster in engagement within threaded hole of link 150; a range of motion for adjustment of default position of lever 155 is provided between link 150 and lever 155. Compare FIGS. 9A and 10A (adjustment stop at near distance/position with flange surface 160b of flange of adjuster 160 in engagement with stop surface 150b of link 150) with FIGS. 9C and 10C (adjustment stop at far distance/position with stop surface 150a of link 150 in engagement with stop surface 155b of lever 155). See also TABLE A and FIGS. 4, 5, 6, 7 and 8.

Figure 10A:
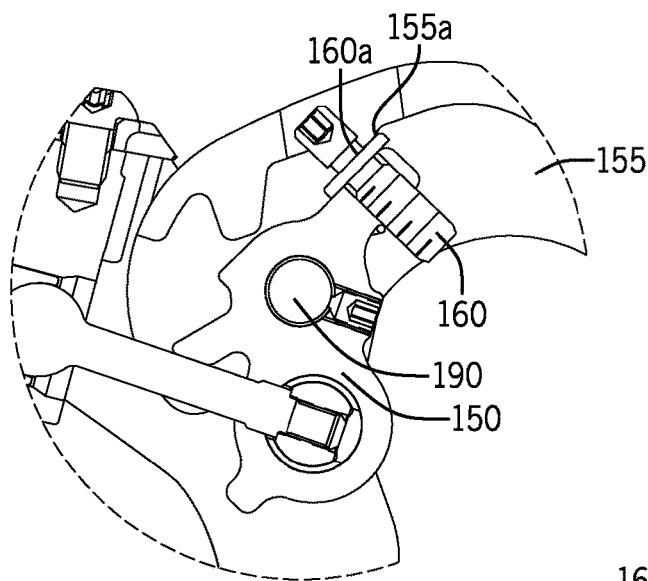
FIGS. 10A to 10C are schematic detail top plan views of a brake assembly according to an exemplary embodiment.

As indicated schematically in FIGS. 9A and 10A, rotation of adjuster 160 to distance D1 brings flange surface 160b of adjuster 160 into contact with stop surface 150b of link 150 and lever 155 into near distance/position R1 relative to handlebar HB; lever 155 is at angle A1 relative to body 105 of brake assembly. See also TABLE A and FIG. 2A. As indicated schematically in FIGS. 3 and 5, cam surface 155a of lever 155 is maintained in engagement with flange surface 160a of adjuster 160 (e.g. due to bias/force from spring 165).

Figure 10B:
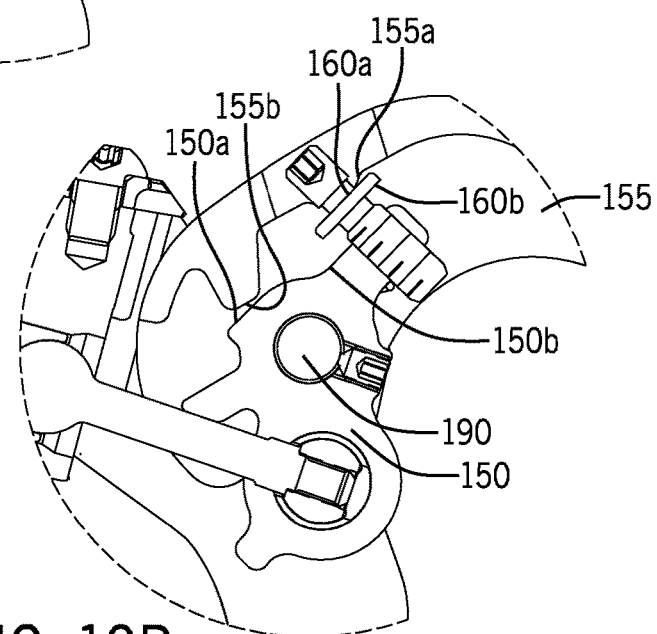

As indicated schematically in FIGS. 9B and 10B, rotation of adjuster 160 to distance D2 brings flange surface 160b of adjuster 160 out of contact with stop surface 150b of link 150 with lever 155 at intermediate distance/position R2 relative to handlebar HB; lever 155 is at angle A2 relative to body 105 of brake assembly. See also TABLE A. As indicated schematically in FIGS. 3 and 5, cam surface 155a of lever 155 is maintained in engagement with flange surface 160a of adjuster 160 (e.g. due to bias/force from spring 165).

Figure 10C:
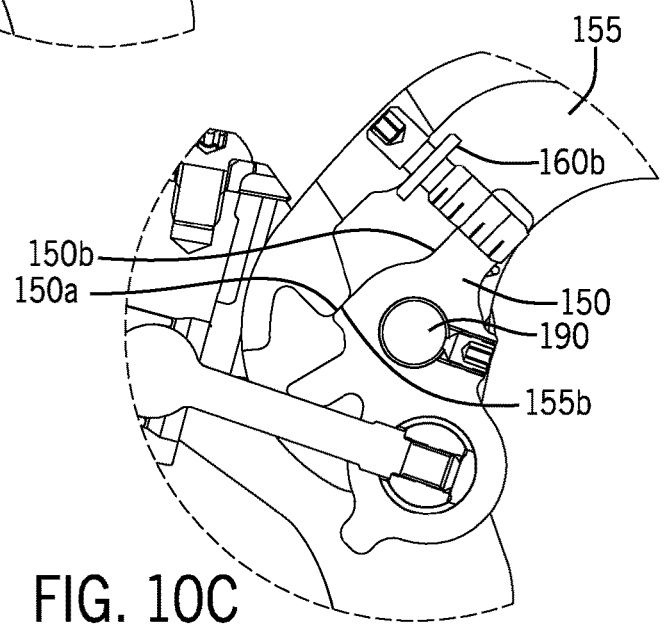

As indicated schematically in FIGS. 9C and 10C, rotation of adjuster 160 to distance D3 brings stop surface 150a of link 150 into contact with stop surface 155b of lever 155 at far distance/position R3 relative to handlebar HB; lever 155 is at angle A3 relative to body 105 of brake assembly. See also TABLE A and FIG. 2B. As indicated schematically in FIGS. 3 and 5, cam surface 155a of lever 155 is maintained in engagement with flange surface 160a of adjuster 160 (e.g. due to bias/force from spring 165).

As indicated schematically according to an exemplary embodiment in FIGS. 4, 9B and 10B, the intermediate distance/position for lever 155 shown representationally as R2 may comprise a range of positions between the near distance/position R1 and the far distance/position R3.

TABLE B

REFERENCE SYMBOL LIST

| REFERENCE SYMBOL | ELEMENT, PART OR COMPONENT |
|---|---|
| B | BICYCLE |
| FR | FRAME |
| FW | FRONT WHEEL |
| RW | REAR WHEEL |
| SP | SEAT POST |
| SE | SEAT |
| TB | STEERING TUBE |
| ST | STEM |
| HB | HANDLEBAR |
| GP | GRIP (HANDLEBAR) |
| FK | FRONT FORK ASSEMBLY |
| SH | REAR SHOCK ABSORBER FOR SUSPENSION SYSTEM |
| BR | BRAKE SYSTEM |
| DS | DISC/ROTOR (BRAKE) |
| PD | PEDAL |
| RA | REMOTE ADJUSTER |
| TL | TOOL |

TABLE C

REFERENCE SYMBOL LIST

| REFERENCE SYMBOL | ELEMENT, PART OR COMPONENT |
|---|---|
| 100 | BRAKE ASSEMBLY/ MASTER CYLINDER ASSEMBLY |
| 105 | BODY |
| 110 | PISTON |
| 115 | BUSHING |
| 120 | PRIMARY CUP |
| 125 | SECONDARY CUP |
| 130 | SPRING |
| 135 | PUSHROD |
| 140 | NUT |
| 145 | BUSHING |
| 150 | LINK |
| | stop surface 150a |
| | stop surface 150b |
| | threaded hole 150c |
| | pivot/hole 150d |
| 155 | LEVER |

TABLE C-continued

REFERENCE SYMBOL LIST

| REFERENCE SYMBOL | ELEMENT, PART OR COMPONENT |
|---|---|
| | cam surface 155a |
| | stop surface 155b |
| | pivot/hole 155c |
| | slot 155d |
| 160 | ADJUSTER |
| | flange surface 160a |
| | flange surface 160b |
| | socket 160c |
| | threaded portion 160d |
| 165 | TORSION SPRING |
| 190 | PIN |
| 195 | BUSHING |
| 205 | BLADDER |
| 210 | COVER |
| 215 | SCREW |
| 220 | CLAMP (BASE) |
| 225 | SCREW (CLAMP) |
| 230 | BLEED PLUG |
| 240 | SET SCREW |

TABLE D

REFERENCE SYMBOL LIST

| REFERENCE SYMBOL | ELEMENT, PART OR COMPONENT |
|---|---|
| 1000 | MASTER CYLINDER ASSEMBLY |
| 1005 | BODY |
| 1050 | LINK |
| 1055 | LEVER |
| 1060 | SLIDE |
| 1070 | ADJUSTER KNOB |
| 1075 | PLATE (WASHER) |
| 1080 | BALL |
| 1085 | SPRING |
| 1090 | PIN |

EXEMPLARY EMBODIMENTS

According to an exemplary embodiment shown schematically in FIGS. 2A-2B, 3, 4, 5, 9A-9C and 10A-10C, a brake assembly 100 for bicycle may comprise a body 105, a piston 110 configured for movement at least partially within the body 105, a link 150 connected to the piston 110 and configured for movement relative to the body 105, an adjuster 160 coupled to the link 150 and a lever 155 configured to contact the adjuster 160 and for movement relative to the body 105; the adjuster 160 may be configured so that rotation of the adjuster 160 provides rotation of the lever 155 relative to the link; rotation of the lever 155 relative to the link 150 may comprise adjustment of position of the lever 155 relative to the body 105. See also FIG. 1.

As shown schematically in FIGS. 1, 2A-2B, 3, 4, 9A-9C and 10A-10C, the body 105 may be configured to be mounted on a handlebar HB of a bicycle B; adjustment of position of the lever 155 relative to the body 105 may comprise adjustment of position of the lever 155 relative to the handlebar HB of the bicycle B; the lever 155 may comprise a finger contact point P and adjustment of position of the lever 155 relative to the body 105 may comprise adjustment of distance of the finger contact point P to the handlebar HB.

As shown schematically in FIGS. 2A-2B, 3, 4, 9A-9C and 10A-10C, the assembly may comprise a grip GP; the grip GP may be configured to be mounted on the handlebar HB and adjustment of position of the lever 155 relative to the body 105 may comprise adjustment of distance of the finger contact point P to the grip GP; the adjuster 160 may be coupled to the link 150 by a threaded connection; the adjuster 160 may be an adjuster screw; the link 150 may be configured for pivoting movement relative to the body 105. See also FIGS. 5, 6, 7 and 8.

As shown schematically in FIGS. 2A-2B, 3, 4, 9A-9C and 10A-10C, the lever 155 may be configured for pivoting movement relative to the body 105; the lever 155 and the link 150 may be configured to pivot on the same axis; the lever 155 may comprise a surface 155b; the link 150 may comprise a first surface 150a; rotation of the lever 155 relative to the link 150 may be limited by contact between the surface on the lever 155b and the first surface on the link 150a.

As shown schematically in FIGS. 2A-2B, 3, 4, 9A-9C and 10A-10C, the adjuster 160 may comprise a surface; the link 150 of the assembly may comprise a second surface 150b; rotation of the lever 155 relative to the link 150 may be limited by contact between the surface on the adjuster 160b and the second surface on the link 150b; rotation of the adjuster 160 relative to the link 150 may comprise adjustment of distance of the adjuster surface 160b to the second surface on the link 150b; the lever 155 may comprise a finger contact surface (providing a finger contact point P) and adjustment of position of the lever 155 relative to the body 105 may comprise adjustment of angle of the finger contact surface (at the finger contact point P) relative to the second surface on the link 150b. See also FIGS. 5, 6, 7 and 8.

As shown schematically in FIGS. 2A-2B, 3, 4, 5, 6, 7, 8, 9A-9C and 10A-10C, the assembly may comprise a tool TL configured to adjust the adjuster 160; the adjuster 160 may comprise a socket 160c (to provide an interface for the tool TL); the lever 155 may comprise a slot 155d; the adjuster 160 may be configured to protrude into the slot 155d to allow access at the socket 160c (and the interface for the tool TL); the adjuster 160 may comprise a flange surface 160a; the lever 155 may comprise a cam surface 155a, and the cam surface of the lever 155a may be in contact with the flange surface of the adjuster 160a; movement of the lever 155 toward the handlebar HB may be transmitted through the cam surface of the lever 155a to the flange surface of the adjuster 160a and through the threaded connection to the link 150; the link 150 may be connected to a piston 110 and movement of the link 150 may be transmitted to the piston 110 through a pushrod 135. Position of the lever 155 may comprise a default position.

As shown schematically in FIGS. 2A-2B, 4, 9A-9C and 10A-10C, adjustment of the position of the lever 155 relative to the body 105 may comprise adjustment of the default position of the lever; the default position of the lever may be configured to be adjusted between a near position R1 and a far position R3; adjustment of the position of the lever may comprise adjustment through an intermediate position R2 between the near position R1 and the far position R3.

As shown schematically in FIGS. 1, 2A-2B, 4, 9A-9C and 10A-10C, body 105 may be configured to be mounted on a handlebar HB; the lever 155 may comprise a reference point P; in the near position R1 the reference point of the lever P may be nearer to the handlebar HB than in the far position R3; in the far position R3 the reference point P of the lever 155 may be farther from the handlebar HB than in the near position R1; the intermediate position R2 may comprise a range of positions between the near position R1 and the far position R3; the adjuster 160 may be configured to adjust the lever 155 from the near position R1 to the far position R3 through the intermediate position R2; the assembly may comprise a stop for the lever 155 at the near position R1; the assembly may comprise a stop for the lever 155 at the far position R3. See also FIGS. 3, 5, 6, 7 and 8.

According to an exemplary embodiment as shown schematically in FIGS. 1, 2A-2B, 3, 4, 9A-9C and 10A-10C, an apparatus configured for a brake system of a bicycle B may comprise a body 105, a piston 110 configured for movement at least partially within the body 105, a link 150 connected to the piston 110 and configured for movement relative to the body 105, an adjuster 160 coupled to the link 150, a lever 155 configured to contact the adjuster 160 and for movement relative to the body 105; the adjuster 160 may be configured so that rotation of the adjuster 160 provides rotation of the lever 155 relative to the link 150; rotation of the lever 155 relative to the link 150 may comprise adjustment of position of the lever 155 relative to the body 105. See also FIGS. 5, 6, 7 and 8.

According to an exemplary embodiment as shown schematically in FIGS. 2A-2B, 3, 4, 9A-9C and 10A-10C, the apparatus may comprise a tool TL configured to adjust the adjuster 160. The body 105 may be configured to be mounted on a handlebar HB of the bicycle B; adjustment of position of the lever 155 relative to the body 105 may comprise adjustment of position of the lever 155 relative to the handlebar HB of the bicycle B. As shown schematically in FIGS. 1 and 2A-2B, the apparatus may comprise a brake assembly; the apparatus may comprise a brake master cylinder assembly 100.

According to an exemplary embodiment as shown schematically in FIGS. 2A-2B, 3, 4, 9A-9C and 10A-10C, a master cylinder assembly 100 may comprise a body 105, a piston 110 configured for movement at least partially within the body 105, a link 150 connected to the piston 110 and configured for movement relative to the body 105, an adjuster 160 coupled to the link 150, a lever 155 configured to contact the adjuster 160 and for movement relative to the body 105; the adjuster 160 may be configured so that rotation of the adjuster 160 provides rotation of the lever 155 relative to the link 150; rotation of the lever 155 relative to the link 150 may comprise adjustment of position of the lever 155 relative to the body 105. See also FIGS. 5, 6, 7 and 8.

According to an exemplary embodiment as shown schematically in FIGS. 2A-2B, 3, 4, 9A-9C and 10A-10C, a hydraulic assembly actuated by use of hydraulic fluid comprising a body 105, a piston 110 configured for movement at least partially within the body 105 to actuate hydraulic fluid, a link 150 connected to the piston 110 and configured for movement relative to the body 105, an adjuster 160 coupled to the link 150, a lever 155 configured to contact the adjuster 160 and for movement relative to the body 105; the adjuster 160 may be configured so that rotation of the adjuster 160 provides of the rotation of the lever 155 relative to the link 150; rotation of the lever 155 relative to the link 150 may comprise adjustment of position of the lever 155 relative to the body 105; position of the lever 155 may comprise a default position; adjustment of the position of the lever 155 relative to the body 105 may comprise adjustment of the default position of the lever 155; the default position of the lever 155 may be configured to be adjusted between a near position R1 and a far position R3. See also TABLE A and FIGS. 5, 6, 7 and 8.

According to an exemplary embodiment as shown schematically in FIGS. 2A-2B, 4, 9A-9C and 10A-10C, a method of adjustment of a brake assembly comprising a body 105 providing a lever 155 and configured to be mounted on a handlebar HB may comprise the steps of rotation of an adjuster 160, translation of the adjuster 160 relative to a link 150, translation of a cam surface of the lever 155*a* along a surface of the adjuster 160*a* and pivoting of the lever 155 relative to the body 105; position of the lever 155 relative to the handlebar HB can be adjusted. As shown schematically in FIGS. 2A-2B, 4, 9A-9C and 10A-10C, the method may comprise the step of rotation of the adjuster 160 with a tool TL; the method may comprise the step of rotation of the lever 155 relative to a handlebar HB. As shown schematically in FIGS. 2A-2B, 3, 4, 9A-9C and 10A-10C, actuation of the brake assembly at the lever 155 may comprise pivoting of the lever 155 relative to the handlebar HB.

As shown schematically in FIGS. 2A-2B, 4, 9A-9C and 10A-10C, the method may comprise the step of modification of a distance of a finger contact point P on the lever 155 to the handlebar HB; position of the lever 155 may comprise a default position; rotation of the adjuster 160 may comprise adjustment of the position of the lever 155 relative to the body 105; adjustment of the position of the lever 155 relative to the body 105 may comprise adjustment of the default position of the lever 155; the default position of the lever 155 may be configured to be adjusted between a near position R1 and a far position R3; adjustment of the position of the lever 155 may comprise adjustment through an intermediate position R2 between the near position R1 and the far position R3. See also TABLE A.

As shown schematically in FIGS. 2A-2B, 4, 9A-9C and 10A-10C, the lever 155 may comprise a reference point P; in the near position R1 the reference point P of the lever 155 may be nearer to the handlebar HB than in the far position R3; in the far position R3 the reference point P of the lever 155 may be farther from the handlebar HB than in the near position R1; the intermediate position R2 may comprise a range of positions between the near position R1 and the far position R3; the adjuster 160 may be configured to adjust the lever 155 from the near position R1 to the far position R3 through the intermediate position R2; the assembly may comprise a stop for the lever 155 at the near position R1; the assembly may comprise a stop for the lever 155 at the far position R3. See also TABLE A.

As shown schematically in FIGS. 2A-2B, 3, 4, 5, 6, 7, 8, 9A-9C and 10A-10C, the link 150 may be connected to a piston 110 and movement of the link 150 may be transmitted to the piston 110; the link 150 may be connected to a piston 110 and movement of the link 150 may be transmitted to the piston 110 through a pushrod 135; the link 150 may be connected to a piston 110 and movement of the link 150 may be transmitted to the piston 110 through a pushrod 135 for braking action actuated by the lever 155; the lever 155 may be configured to remain in the default position until actuated by an operator.

Conventional Arrangement—Operation/Adjustment

Figure 11:
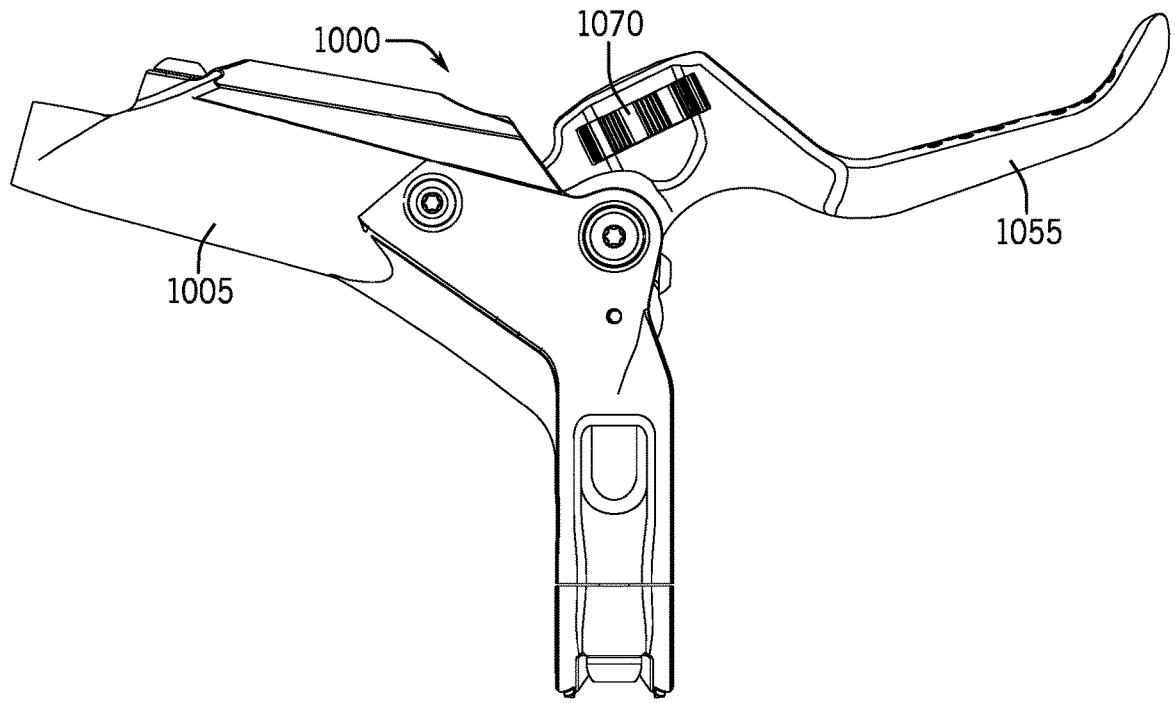
FIG. 11 is a schematic top plan view of a brake assembly.
Figure 12:
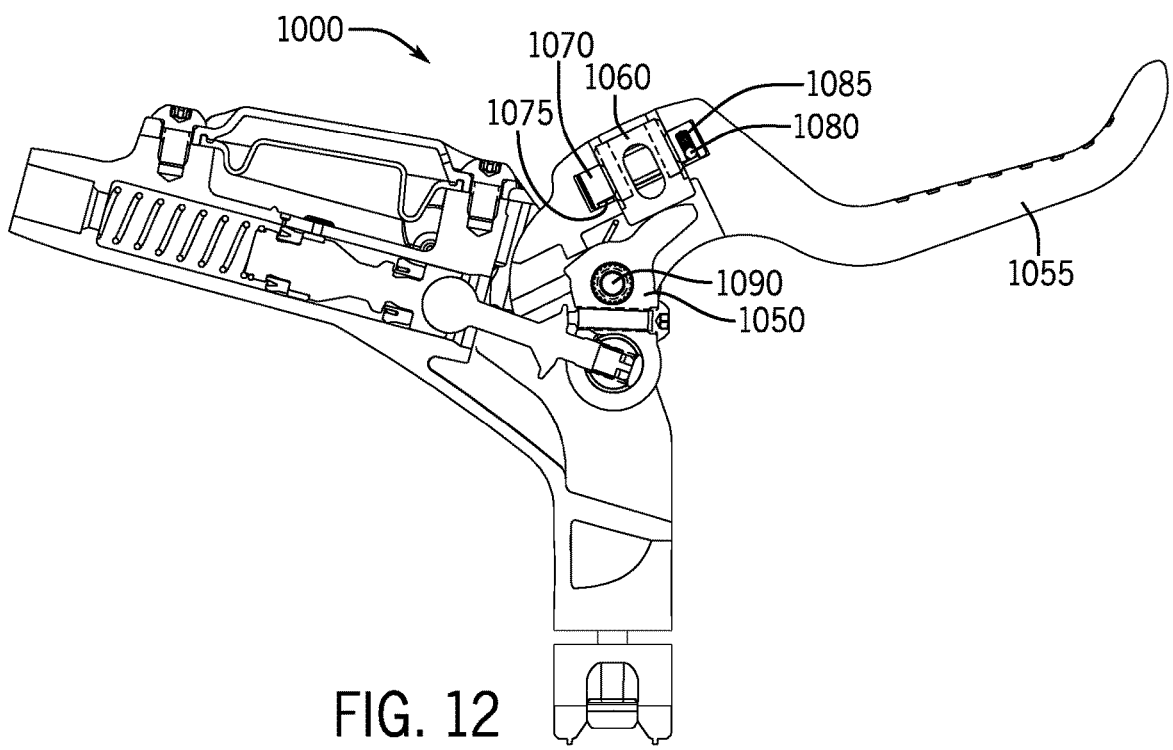
FIG. 12 is a schematic cut-away top plan view of a brake assembly.

Referring to FIGS. 11 and 12, a conventional arrangement for a brake assembly/master cylinder assembly 1000 comprises a body 1005 configured to be attached to a handlebar with a clamp and lever 1055 configured to provide an operator control for the brake system (by engaging a piston assembly/piston); the position of lever 1055 relative to the body 1005 (and handlebar) can be adjusted by an adjuster knob 1070. As indicated schematically in FIG. 12, the rotation of the adjuster knob 1070 causes translation of a slide 1060 that adjusts the position of link 1050 (on pivot/pin 1090) and position of lever 1055 relative to the body 1005 (and handlebar); a detent mechanism with plate 1075, ball 1080 and spring 1085 is provided.

It is important to note that the present inventions (e.g. inventive concepts, etc.) have been described in the specification and/or illustrated in the FIGURES of the present patent document according to exemplary embodiments; the embodiments of the present inventions are presented by way of example only and are not intended as a limitation on the scope of the present inventions. The construction and/or arrangement of the elements of the inventive concepts embodied in the present inventions as described in the specification and/or illustrated in the FIGURES is illustrative only. Although exemplary embodiments of the present inventions have been described in detail in the present patent document, a person of ordinary skill in the art will readily appreciate that equivalents, modifications, variations, etc. of the subject matter of the exemplary embodiments and alternative embodiments are possible and contemplated as being within the scope of the present inventions; all such subject matter (e.g. modifications, variations, embodiments, combinations, equivalents, etc.) is intended to be included within the scope of the present inventions. It should also be noted that various/other modifications, variations, substitutions, equivalents, changes, omissions, etc. may be made in the configuration and/or arrangement of the exemplary embodiments (e.g. in concept, design, structure, apparatus, form, assembly, construction, means, function, system, process/method, steps, sequence of process/method steps, operation, operating conditions, performance, materials, composition, combination, etc.) without departing from the scope of the present inventions; all such subject matter (e.g. modifications, variations, embodiments, combinations, equivalents, etc.) is intended to be included within the scope of the present inventions. The scope of the present inventions is not intended to be limited to the subject matter (e.g. details, structure, functions, materials, acts, steps, sequence, system, result, etc.) described in the specification and/or illustrated in the FIGURES of the present patent document. It is contemplated that the claims of the present patent document will be construed properly to cover the complete scope of the subject matter of the present inventions (e.g. including any and all such modifications, variations, embodiments, combinations, equivalents, etc.); it is to be understood that the terminology used in the present patent document is for the purpose of providing a description of the subject matter of the exemplary embodiments rather than as a limitation on the scope of the present inventions.

It is also important to note that according to exemplary embodiments the present inventions may comprise conventional technology (e.g. as implemented and/or integrated in exemplary embodiments, modifications, variations, combinations, equivalents, etc.) or may comprise any other applicable technology (present and/or future) with suitability and/or capability to perform the functions and processes/operations described in the specification and/or illustrated in the FIGURES. All such technology (e.g. as implemented in embodiments, modifications, variations, combinations, equivalents, etc.) is considered to be within the scope of the present inventions of the present patent document.

The invention claimed is:

1. A brake assembly comprising:
    (a) a body providing a pivot axis;
    (b) a piston configured for movement at least partially within the body;
    (c) a link connected to the piston and configured for pivoting movement relative to the body about the pivot axis;
    (d) an adjuster threaded to the link;
    (e) a lever configured to contact the adjuster and for pivoting movement relative to the body about the pivot axis;
    wherein the adjuster is configured so that rotation of the adjuster provides rotation of the lever relative to the link at the pivot axis;
    wherein rotation of the lever relative to the link comprises adjustment of position of the lever relative to the body.

2. The assembly of claim 1 wherein the body is configured to be mounted on a handlebar of a bicycle; wherein the lever comprises a finger contact point; and wherein adjustment of position of the lever relative to the body comprises adjustment of distance of the finger contact point to the handlebar.

3. The assembly of claim 1 wherein the adjuster is threaded to the link by a threaded connection within the link.

4. The assembly of claim 1 wherein the link comprises a first surface; wherein the lever comprises a stop surface; wherein rotation of the lever relative to the link is limited by contact between stop surface of the lever and the first surface on the link.

5. The assembly of claim 1 wherein the link comprises a second surface; wherein the adjuster comprises a surface; wherein rotation of the lever relative to the link is limited by contact between the surface on the adjuster and the second surface on the link.

6. The assembly of claim 1 wherein the adjuster comprises a tool interface; wherein the lever comprises a slot; and wherein the adjuster is configured to protrude into the slot to allow access at the tool interface.

7. The assembly of claim 1 wherein the adjuster comprises a flange surface; wherein the lever comprises a cam surface, and wherein the cam surface of the lever is in contact with the flange surface of the adjuster.

8. The assembly of claim 7 wherein the link is connected to the piston and wherein movement of the lever toward the handlebar is transmitted through the cam surface of the lever to the flange surface of the adjuster and through the threaded connection to the link and to the piston.

9. The assembly of claim 1 wherein position of the lever comprises a default position; wherein adjustment of the position of the lever relative to the body comprises adjustment of the default position of the lever; wherein the default position of the lever is configured to be adjusted between a near position and a far position through a range of intermediate positions.

10. The assembly of claim 9 wherein the body is configured to be mounted on a handlebar; wherein the lever comprises a reference point; wherein in the near position the reference point of the lever is nearer to the handlebar than in the far position; wherein in the far position the reference point of the lever is farther from the handlebar than in the near position.

11. The assembly of claim 10 further comprising a stop for the lever at the near position and a stop for the lever at the far position.

12. A hydraulic assembly actuated by use of hydraulic fluid comprising:
    (a) a body a providing a pivot axis;
    (b) a piston configured for movement at least partially within the body to actuate hydraulic fluid;
    (c) a link connected to the piston and configured for movement relative to the body;
    (d) an adjuster threaded to the link;

(e) a lever configured to contact the adjuster and for movement relative to the body;
wherein the lever is configured for rotation about the pivot axis;
wherein the adjuster is configured so that rotation of the adjuster provides rotation of the lever relative to the link at the pivot axis;
wherein rotation of the lever relative to the link comprises adjustment of position of the lever relative to the body.

13. The assembly of claim 12 wherein position of the lever comprises a default position; wherein adjustment of the position of the lever relative to the body comprises adjustment of the default position of the lever; wherein the default position of the lever is configured to be adjusted between a near position and a far position.

14. A method of adjustment of a brake assembly comprising a body providing a lever and configured to be mounted on a handlebar comprising the steps of:
(a) rotation of an adjuster;
(b) translation of the adjuster relative to a link;
(c) movement by cam action of a cam surface of the lever along a surface of the adjuster;
(d) pivoting of the lever relative to the body at a pivot axis;
(e) rotation of the lever relative to the handlebar;
so that position of the lever relative to the handlebar can be adjusted.

15. The method of claim 14 further comprising the step of rotation of the adjuster with a tool.

16. The method of claim 14 wherein position of the lever comprises a default position; wherein rotation of the adjuster comprises adjustment of the position of the lever relative to the body; wherein adjustment of the position of the lever relative to the body comprises adjustment of the default position of the lever; wherein the default position of the lever is configured to be adjusted between a near position and a far position through a range of intermediate positions.

17. The method of claim 16 wherein the lever comprises a reference point; wherein in the near position the reference point of the lever is nearer to the handlebar than in the far position; wherein in the far position the reference point of the lever is farther from the handlebar than in the near position.

18. The method of claim 16 further comprising a stop for the lever at the near position and a stop for the lever at the far position.

19. The method of claim 14 wherein the link is connected to a piston; and wherein movement of the link is transmitted to the piston.

20. The method of claim 16 wherein the lever is configured to remain in the default position until actuated by an operator; wherein the pivot axis for pivoting the lever is provided by a pin within the body and within the link and within the lever; wherein the step of pivoting of the lever relative to the body at the pivot axis comprises pivoting of the lever at the pin.

* * * * *